(12) United States Patent
Li et al.

(10) Patent No.: US 10,281,952 B2
(45) Date of Patent: May 7, 2019

(54) COVER

(71) Applicant: ASUSTEK COMPUTER INC., Taipei (TW)

(72) Inventors: Qing Li, Taipei (TW); Wean-Fong Loi, Taipei (TW); Kuan-Pei Lee, Taipei (TW); Chun-Lun Lee, Taipei (TW); Jian-Ting Alden Koh, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/609,883

(22) Filed: May 31, 2017

(65) Prior Publication Data

US 2017/0351299 A1 Dec. 7, 2017

Related U.S. Application Data

(60) Provisional application No. 62/343,985, filed on Jun. 1, 2016.

(30) Foreign Application Priority Data

Mar. 29, 2017 (CN) .......................... 2017 1 0197207

(51) Int. Cl.
*G06F 1/16* (2006.01)
*A45C 13/00* (2006.01)
*A45C 13/10* (2006.01)
*A45C 11/00* (2006.01)

(52) U.S. Cl.
CPC .......... *G06F 1/1628* (2013.01); *A45C 13/005* (2013.01); *A45C 13/1069* (2013.01); *G06F 1/1633* (2013.01); *A45C 2011/003* (2013.01); *A45C 2200/15* (2013.01)

(58) Field of Classification Search
None
See application file for complete search history.

(56) References Cited

U.S. PATENT DOCUMENTS

| 9,268,365 | B2 * | 2/2016 | Chang | G06F 1/1633 |
| 9,372,511 | B2 | 6/2016 | Yeh et al. | |
| 9,489,054 | B1 * | 11/2016 | Sumsion | G06F 3/0208 |
| 9,742,458 | B2 * | 8/2017 | Ahee | H04B 1/3888 |

(Continued)

FOREIGN PATENT DOCUMENTS

| CN | 202795184 U | 3/2013 |
| CN | 203858589 U | 10/2014 |
| TW | I510169 B | 11/2015 |

*Primary Examiner* — Xanthia C Cunningham
(74) *Attorney, Agent, or Firm* — Muncy, Geissler, Olds & Lowe, P.C.

(57) ABSTRACT

A cover adapted to a first electronic device is provided. The first electronic device includes a first electrical connector. The cover comprises: a connecting portion; a covering portion extending from the connecting portion to cover the first electronic device; and a pivot portion. The pivot portion includes a fixing pivot member fixed to the connecting portion; and a magnetic pivot member pivotally connected to the fixing pivot member and including a second electrical connector. The second electrical connector is electrically connected to the first electrical connector when the first electronic device is connected to the magnetic pivot member.

19 Claims, 9 Drawing Sheets

(56) References Cited

U.S. PATENT DOCUMENTS

| | | | | |
|---|---|---|---|---|
| 2012/0018324 A1* | 1/2012 | Hale | ............... | F16M 11/041 |
| | | | | 206/320 |
| 2012/0194448 A1* | 8/2012 | Rothkopf | ............ | A45C 13/002 |
| | | | | 345/173 |
| 2014/0246340 A1* | 9/2014 | Jiang | ............... | A45C 11/00 |
| | | | | 206/45.23 |
| 2015/0316960 A1* | 11/2015 | Tseng | ............... | A45C 13/005 |
| | | | | 359/822 |
| 2017/0010635 A1* | 1/2017 | Lockwood | ............ | G06F 1/1628 |

* cited by examiner

COVER

CROSS-REFERENCE TO RELATED APPLICATION

This application claims the priority benefit of U.S. provisional application Ser. No. 62/343,985, filed on Jun. 1, 2016 and CN application serial No. 201710197207.6, filed on Mar. 29, 2017. The entirety of the above-mentioned patent application is hereby incorporated by references herein and made a part of specification.

BACKGROUND OF THE INVENTION

Field of the Invention

The disclosure relates to a cover and, and more specifically, to a cover of an electronic device.

Description of the Related Art

Electronic devices are widely used in daily life and work. A keyboard is usually applied for text input. However, either a wired keyboard or a wireless keyboard exist shortcomings.

To apply the keyboard wireless, such a Bluetooth keyboard, a Bluetooth connection should be established first between the keyboard and the electronic device. Thus, it is inefficient for using keyboard wirelessly. However, to apply the keyboard wired, the electronic device cannot be portable since there is a physical wire connecting the keyboard and the electronic device, which is also inconvenient.

BRIEF SUMMARY OF THE INVENTION

According to an aspect of the disclosure, a cover adapted to a first electronic device with a first electrical connector is provided. The cover comprises a connecting portion, a covering portion and a pivot portion. The covering portion extends from the connecting portion to cover the first electronic device. The pivot portion includes a fixing pivot member and a magnetic pivot member. The fixing pivot member is fixed to the connecting portion. The magnetic pivot member is pivotally connected to the fixing pivot member and includes a second electrical connector. The second electrical connector is electrically connected to the first electrical connector when the first electronic device is connected to the magnetic pivot member.

In embodiments, the cover is magnetically attached to the first electronic device via the pivot portion. The first electronic device is electronically connected to the second electronic device via the pivot portion and the covering portion. Thus, the first electronic device can be electronically connected to the second electronic device quickly, and the first electronic can be covered by the cover. When the first electronic device is covered by the cover, the whole device has a smooth appearance and is portable. When the cover is not assembled to the first electronic device, the second electronic device disposed at the electronic device attaching portion is covered by the cover via the covering portion. Thus, the second electronic device is protected effectively.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

These and other features, aspects, and advantages of the disclosure will become better understood with regard to the following description, appended claims, and accompanying drawings. However, the embodiments are not limited herein. The description of the operation of components is not used for limiting the execution sequence. Any equivalent device with the combination according to the disclosure is in the scope of the disclosure. The components shown in figures are not used for limit the size or the proportion.

Figure 1:
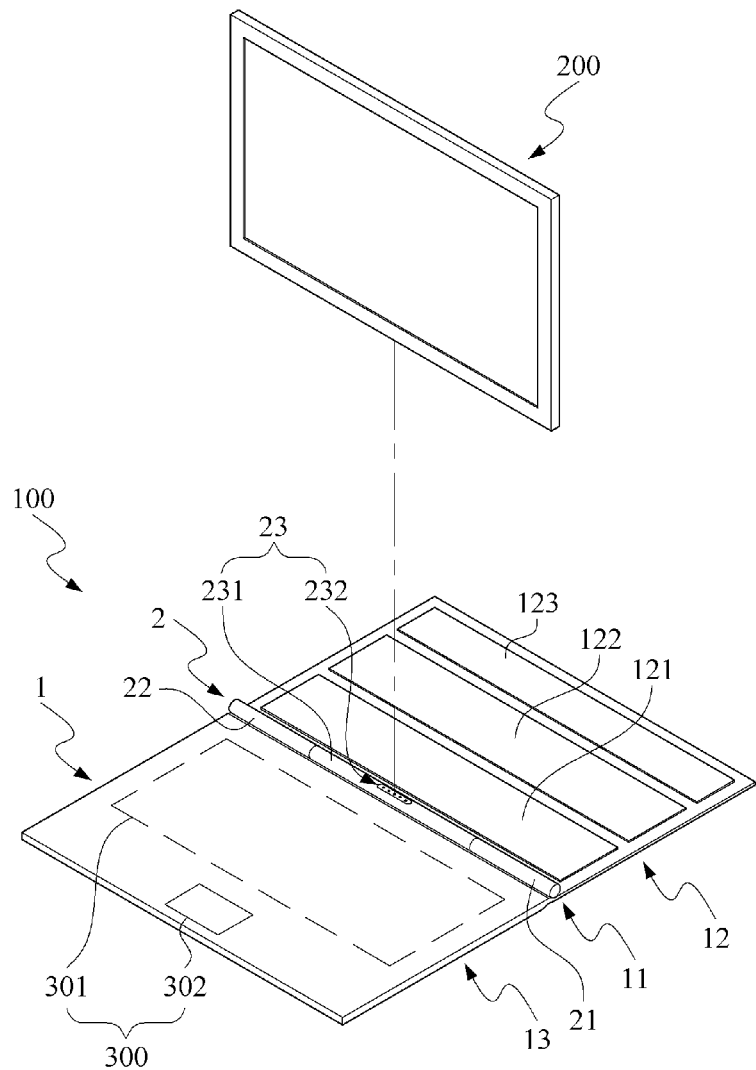
FIG. 1 is an exploded view of a cover and a first electronic device in assembly in a first embodiment.
Figure 2A:
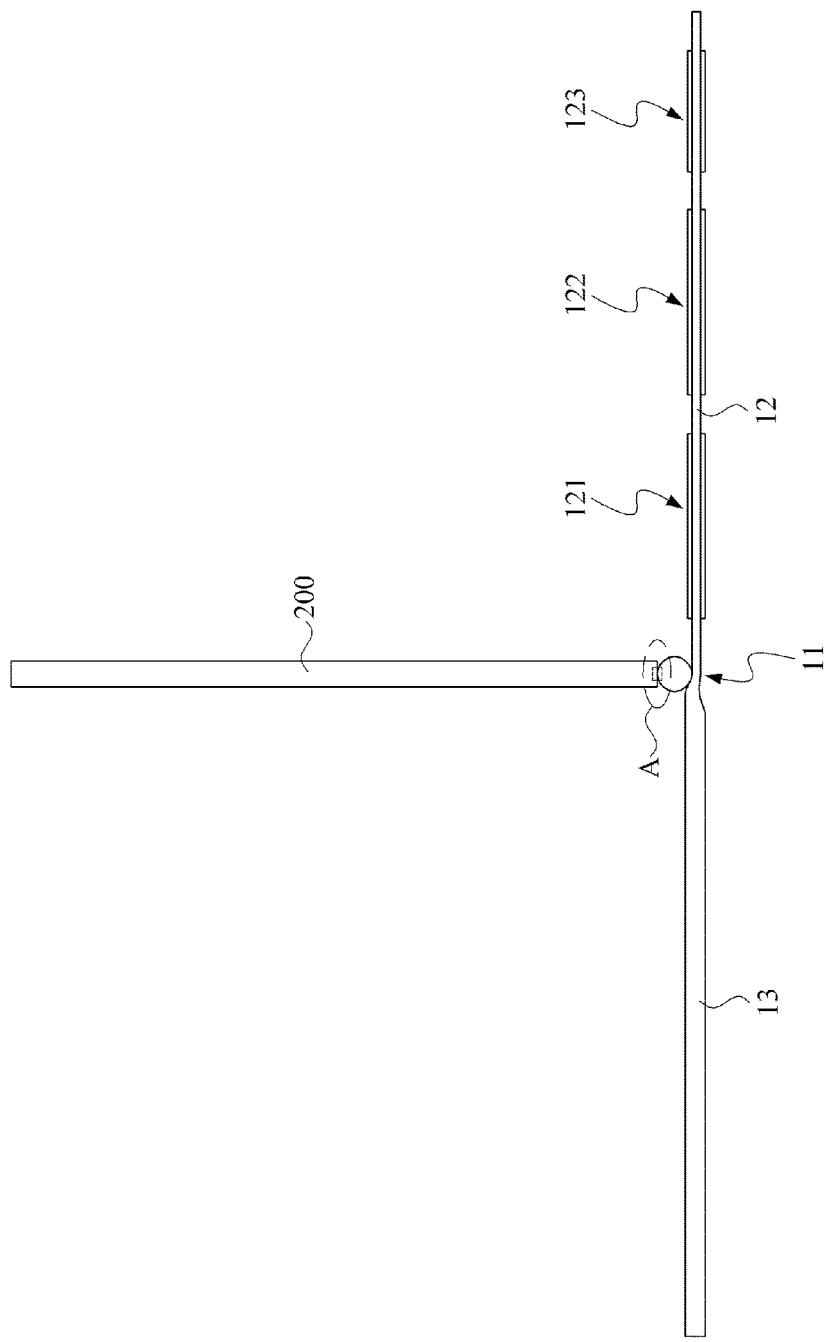
FIG. 2A is a plan view showing the cover is magnetically attached to the first electronic device via a pivot portion according to the first embodiment.
Figure 2B:
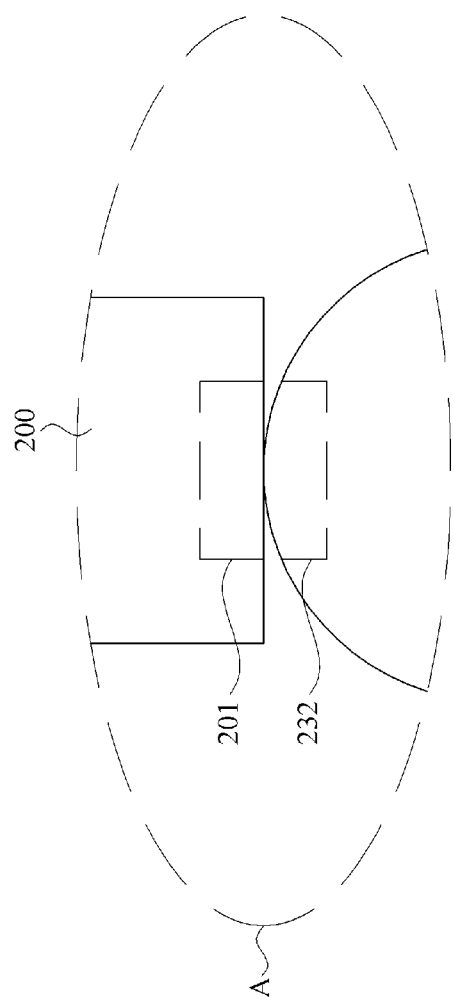
FIG. 2B is an enlarged view of a portion in a circle A in FIG. 2A in an embodiment.

Please refer to FIG. 1, FIG. 2A and FIG. 2B. FIG. 1 is an exploded view of a cover and a first electronic device in assembly in a first embodiment. FIG. 2A is a plan view showing the cover is magnetically attached to the first electronic device via a pivot portion according to the first embodiment. FIG. 2B is an enlarged view of a portion in a circle A in FIG. 2A in an embodiment.

In an embodiment, a cover 100 includes a connecting portion 11, a covering portion 12 and a pivot portion 2.

The covering portion 12 includes three folding sections 121, 122 and 123. The folding section 121 extends from the connecting portion 11. The folding section 122 is integratedly connected to the folding section 121. The folding section 123 is integratedly connected to the folding section 122. The folding section 121, 122 and 123 are connected foldably. The support structure is formed by folding the folding sections 121, 122 and 123.

In an embodiment, the covering portion 12 is made of flexible materials, such as flexible plastic, silica gel or leather. Rigid sheets, such as metal sheets or rigid plastic sheets are embedded inside the covering portion 12 to form the folding sections 121, 122 and 123.

The covering portion 12 is foldable to cover the first electronic device 200. The first electronic device 200 is supported to stand via a support structure formed by the folding sections 121, 122 and 123.

In an embodiment, the first electronic device 200 is a display device. The display device is, but not limited to, a display screen or a tablet with a touch screen.

The electronic device attaching portion 13 is integratedly connected to an opposite side of the connecting portion 11 relative to the covering portion 12. A second electronic device 300 is attached at the electronic device attaching portion 13. In the embodiment, the second electronic device 300 is a keyboard device. The keyboard device is mounted on the electronic device attaching portion 13. In an embodiment, the keyboard device includes a keyboard module 301 and a cursor operation module 302.

The pivot portion 2 includes two fixing pivot members 21 and 22 and a magnetic pivot member 23. The fixing pivot members 21 and 22 are fixed at two ends of the connecting portion 11, respectively. In the embodiment, the fixing pivot member 21 is electrically connected to the second electronic device 300 via a soft circuit board or a flat cable that are embedded in the connecting portion 11 and the electronic device attaching portion 13. In an embodiment, the fixing pivot members 21 and 22 are electrically connected to the second electronic device 300, respectively, which is not limited herein.

The magnetic pivot member 23 includes a magnetic rotating shaft 231 and a second electrical connector 232. The magnetic rotating shaft 231 is connected pivotally between the fixing pivot members 21 and 22. The second electrical connector 232 is configured at the magnetic rotating shaft 231. The second electrical connector 232 is electrically connected to the fixing pivot member 21. The second electrical connector 232 is electrically connected to the second electronic device 300 via the fixing pivot member 21. Thus, when the magnetic rotating shaft 231 is magnetically attached to first electronic device 200, the second electrical connector 232 is electrically connected to the first electrical connector 201 of the first electronic device 200 via the magnetic rotating shaft 231.

As shown in FIG. 1, when the first electronic device 200 is not connected to the magnetic pivot member 23, the covering portion 12 covers the electronic device attaching portion 13 to protect the second electronic device 300 configured at the electronic device attaching portion 13.

Figure 3A:
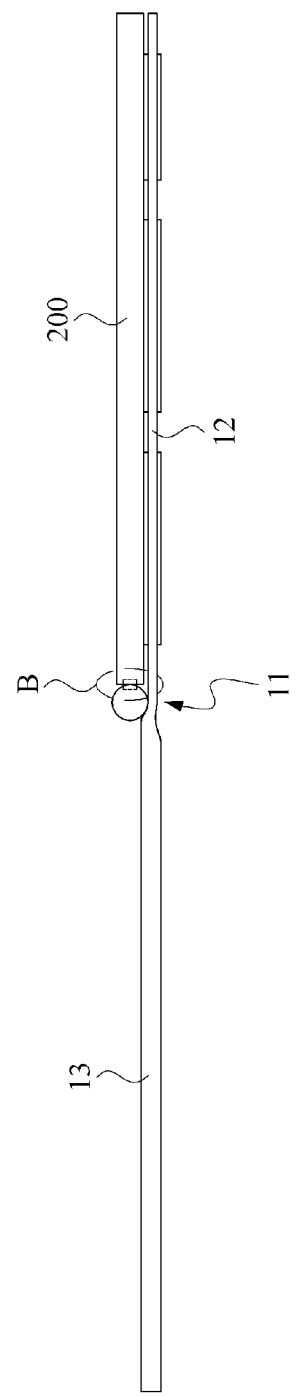
FIG. 3A is a plan view showing the first electronic device rotates to attach to a covering portion according to the first embodiment.
Figure 3B:
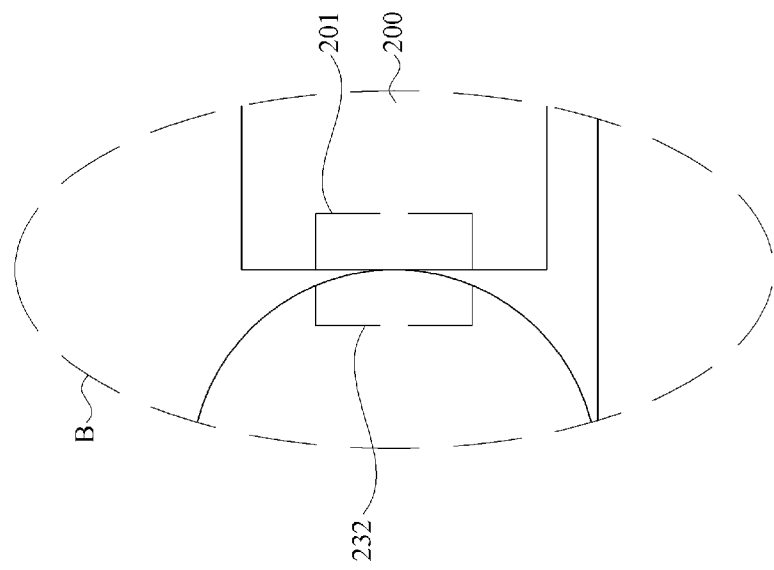
FIG. 3B is an enlarged view of a portion in a circle B in FIG. 3A in an embodiment.

Please refer to FIG. 3A and FIG. 3B. FIG. 3A is a plan view showing the first electronic device rotates to attach to the covering portion according to the first embodiment. FIG. 3B is an enlarged view of a portion in a circle B in FIG. 3A in an embodiment.

As shown in the figures, when the first electronic device 200 is magnetically attached to the magnetic rotating shaft 231 via a side edge of the first electronic device 200, the second electrical connector 232 is electrically connected to the first electrical connector 201. Thus, the first electronic device 200 is electrically connected to the second electronic device 300 that is attached at the electronic device attaching portion 13. The first electronic device 200 is magnetically attached to the magnetic rotating shaft 231. When the first electronic device 200 rotates, the magnetic rotating shaft 231 rotates relative to the two fixing pivot members 21 and 22. Thus, the second electrical connector 232 continues to be electrically connected to first electrical connector 201.

Figure 4:
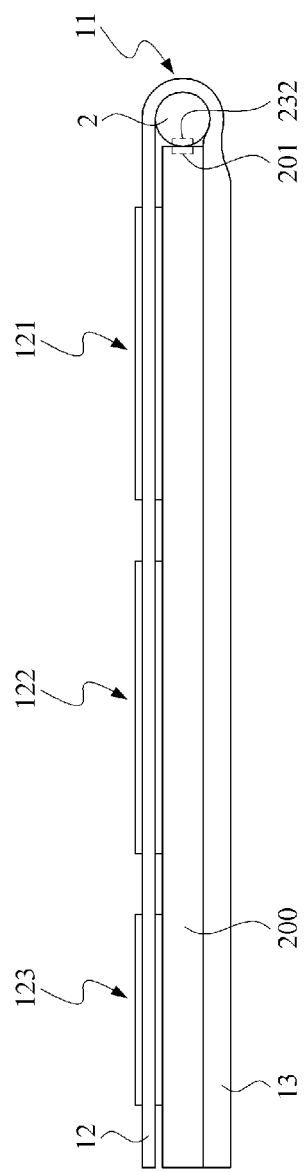
FIG. 4 is a plan view showing the first electronic device is covered by the cover via both a covering portion and an electronic device attaching portion according to the first embodiment.

Please refer to FIG. 4. FIG. 4 is a plan view showing the first electronic device is covered by the cover via both the covering portion and the electronic device attaching portion according to the first embodiment.

As shown in FIG. 1 and FIG. 4, the magnetic pivot member 23 is a cylindric structure.

As a result, when the first electronic device 200 is covered by the covering portion 12 and the electronic device attaching portion 13, the appearance of the connecting portion 11 is smooth. Furthermore, the rotation center would not be changed when the first electronic device 200 rotates by different angles. In such a way, the position of the second electronic device 300 (which is connected to the first electronic device 200) would not be changed when the first electronic device 200 rotates. Thus, the whole device is stable in usage.

Figure 5:
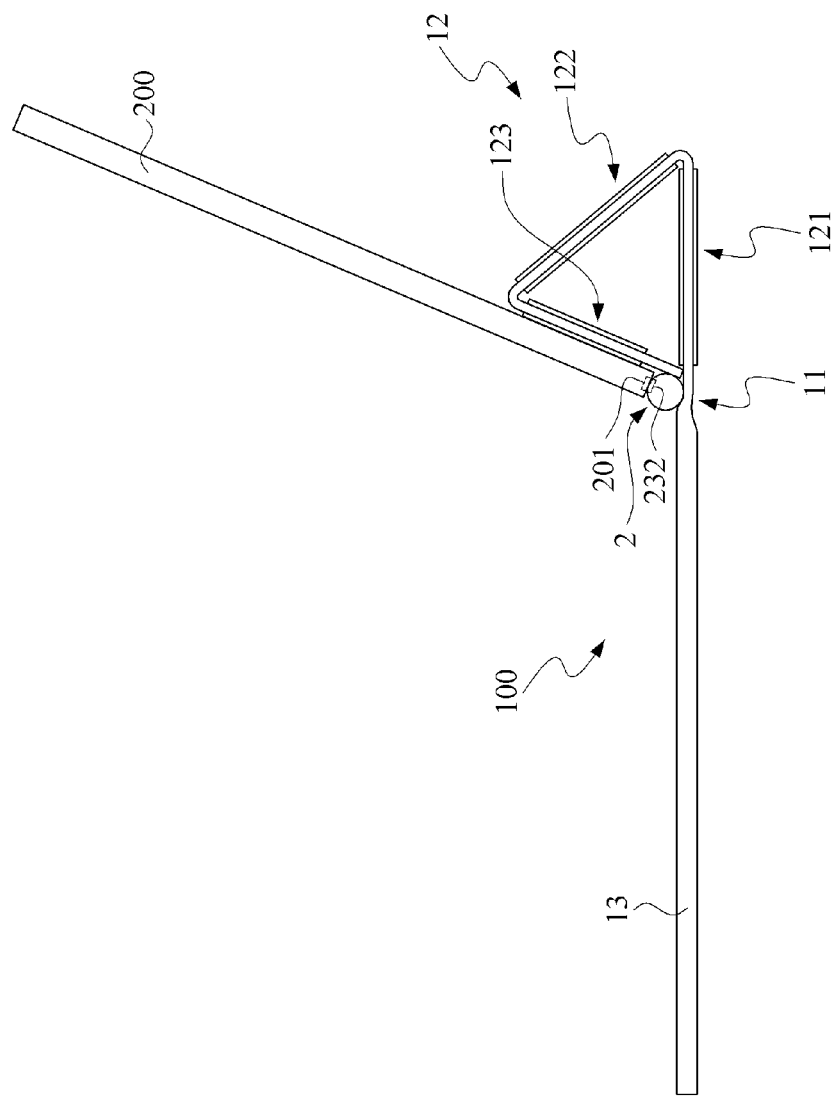
FIG. 5 is a plan view showing the first electronic device is supported to stand by the cover via a support structure that is formed by the covering portion according to the first embodiment.

Please refer to FIG. 5. FIG. 5 is a plan view showing the first electronic device is supported to stand by the cover via the support structure that is formed by the covering portion according to the first embodiment. As shown in FIG. 5, the covering portion 12 includes folding sections 121, 122 and 123. The folding sections 123 and 122 are folded inwardly to make the folding section 123 abut against the pivot portion 2 to form the support structure. The first electronic device 200 is supported to stand by the support structure.

In the first embodiment, the cover 100 is magnetically attached to the first electronic device 200 via the pivot portion 2. The first electronic device 200 is electrically connected to the second electronic device 300 via the covering portion 12 and the pivot portion 2. Thus, the first electronic device 200 can be electrically connected to the second electronic device 300 quickly and is covered by the cover 100. When the first electronic device 200 is covered by the cover 100, the whole device has a smooth appearance and is portable.

Figure 6:
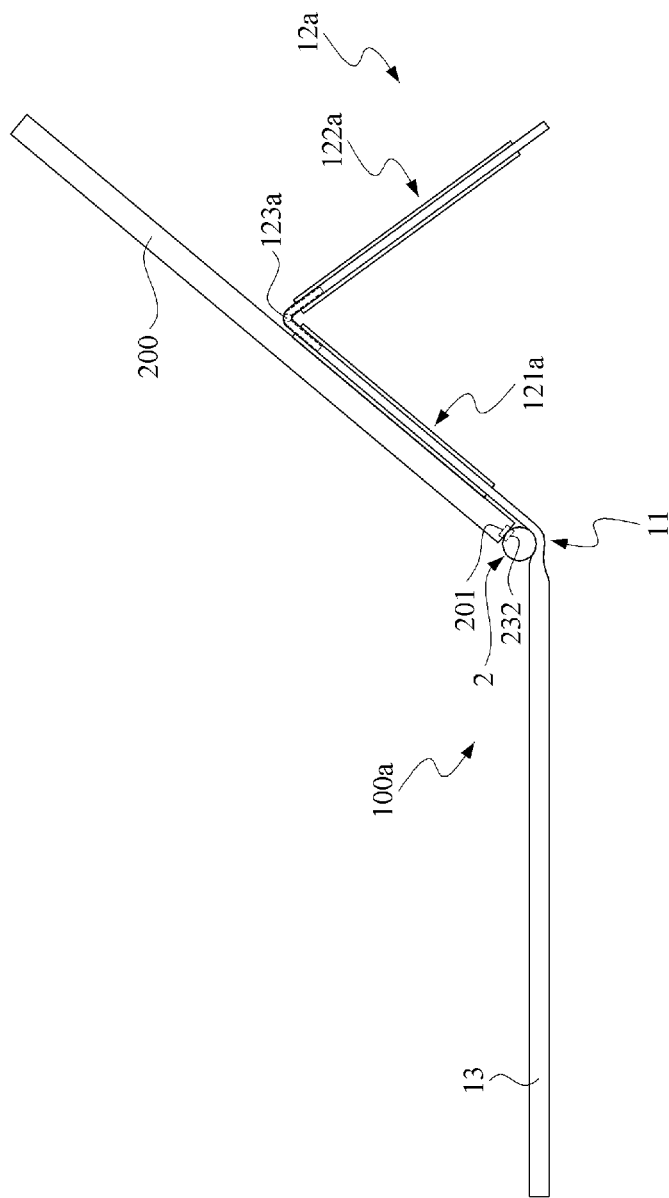
FIG. 6 is a plan view showing a first electronic device is supported via a support structure that is formed by a covering portion in a second embodiment.

Please refer to FIG. 6. FIG. 6 is a plan view showing a first electronic device is supported via a support structure that is formed by a covering portion in a second embodiment. In a second embodiment, as shown in FIG. 6, a cover 100a is provided. A difference between the cover 100a and the cover 100 is that the cover 100a includes a covering portion 12a that replaces the covering portion 12 of the cover 100.

In an embodiment, the covering portion 12a includes two folding sections 121a and 122a and a hinge structure 123a. The folding section 121a extends from the connecting portion 11. The folding section 122a is integratedly connected to the folding section 121a. The hinge structure 123a is configured between the two folding sections 121a and 122a. The hinge structure 123a is connected to the rigid sheet that is disposed inside the folding sections 121a and 122a. Thus, the two folding sections 121a and 122a are positioned via the torsional force of the hinge structure 123a to form the support structure.

In an embodiment, the hinge structure 123a provides the torsional force between the folding sections 121a and 122a. An angle between the folding sections 121a and 122a is adjusted according to the user's requirement to form the support structure of the first electronic device 200. The folding section 122a is supported by a support surface to make the folding section 121a be inclined. The first electronic device 200 that abuts against the folding section 121a is kept to stand.

Figure 7:
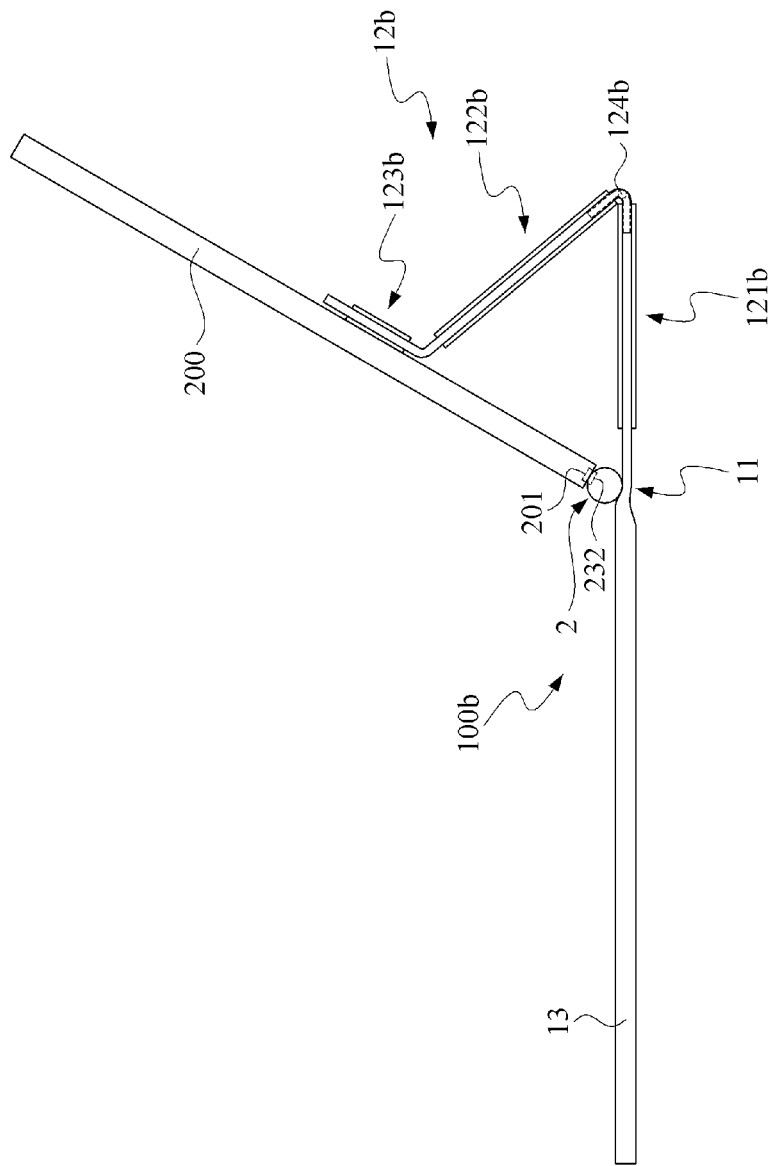
FIG. 7 is a plan view showing a first electronic device is supported via a support structure that is formed by a covering portion in a third embodiment.

Please refer to FIG. 7. FIG. 7 is a plan view showing a first electronic device is supported via a support structure that is formed by a covering portion in a third embodiment. A different between the cover 100b and the cover 100 is that the cover 100b includes the covering portion 12b to replace the covering portion 12 of the cover 100.

In an embodiment, the covering portion 12b includes three folding sections 121b, 122b and 123b and a hinge structure 124b. The folding section 121b extends from the connecting portion 11. The folding section 122b is integratedly connected to the folding section 121b. The folding section 123b is integratedly connected to the folding section 122b. The hinge structure 124b is configured between the folding sections 121b and 122b. The hinge structure 124b is connected to the rigid sheet that is disposed inside the folding sections 121b and 122b. Thus, the two folding sections 121a and 122a are positioned via the torsional force of the hinge structure 123b to form the support structure.

In an embodiment, the folding section 123b is a magnetic-attaching end portion. In other words, magnetic materials are embedded inside the folding section 123b. Thus, the folding section 123b is magnetically attached to the first electronic device 200. Then, the first electronic device 200 is supported more stably.

In the cover of the embodiments, the fixing pivot member of the pivot portion is fixed to the connecting portion. The magnetic pivot member is pivotally connected to the fixing pivot member. Therefore, the first electronic device can be quickly connected via the magnetic attachment. The first electronic device is electrically connected to the second electronic device via the pivot portion. The connection between the first electrical connector and the second electrical connector is kept when the first electronic device rotates. In contrast with a conventional keyboard device which is connected to a smart electronic device, it is convenient to connect the electronic device to the second electronic device by using the magnetic pivot.

In the embodiments, the pivot portion is disposed at the covering portion. The first electronic device is connected to the pivot portion via the magnetic attachment. Both the pivot portion and the first electronic device are covered by the covering portion. Consequently, the appearance of the whole device is smooth when the cover and the first electronic device are combined.

On the other hand, when the cover is not assembled to the first electronic device, the electronic device attaching portion with the second electronic device is covered by the covering portion. Thus, the second electronic device is protected separately.

In other words, when the cover is assembled to the first electronic device, the first electronic device can be covered by the covering portion and the electronic device attaching portion. Thus, the first electronic device is protected effectively. When the first electronic device is not assembled to the cover, the keyboard device configured at the electronic device attaching portion is covered by the covering portion of the cover. Thus, the keyboard device can be protected.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A cover, adapted to a first electronic device with a first electrical connector, the cover comprising:
    a connecting portion;
    a covering portion, extending from the connecting portion to cover the first electronic device; and
    a pivot portion including:
        two fixing pivot members, fixed to the connecting portion; and
        a magnetic pivot member, located between the two fixing pivot members, pivotally connected to the fixing pivot members and including a second electrical connector;
    wherein the second electrical connector is electrically connected to the first electrical connector when the first electronic device is connected to the magnetic pivot member.

2. The cover according to claim 1, wherein the magnetic pivot member includes a magnetic rotating shaft, the second electrical connector is configured at the magnetic rotating shaft, the second electrical connector is electrically connected to the first electrical connector when the magnetic rotating shaft is magnetically attached to the first electronic device.

3. The cover according to claim 1, wherein the covering portion includes a plurality of folding sections, the folding sections are foldably connected with each other, and a support structure is formed by folding the folding sections.

4. The cover according to claim 3, wherein the covering portion further includes a hinge structure, the hinge structure is configured between any two of the folding sections, and the two folding section are positioned to form the support structure.

5. The cover according to claim 4, wherein one of the folding section is a magnetic-attaching end portion, the magnetic-attaching end portion is magnetically attached to the first electronic device.

6. The cover according to claim 1, wherein the first electronic device is a display device.

7. The cover according to claim 6, wherein the display device is a touch display device.

8. The cover according to claim 1, wherein the cover further includes an electronic device attaching portion, the electronic device attaching portion is integratedly connected to an opposite side of the connecting portion relative to the covering portion, and a second electronic device is disposed at the electronic device attaching portion.

9. The cover according to claim 8, wherein the second electronic device is a keyboard device.

10. The cover according to claim 9, wherein the electronic device attaching portion is made of flexible materials, and the keyboard device is disposed at the electronic device attaching portion to form the flexible keyboard device.

11. A cover, adapted to a first electronic device with a first electrical connector, the cover comprising:
    a connecting portion;
    a covering portion, extending from the connecting portion to cover the first electronic device; and
    a pivot portion including:
        a fixing pivot member, fixed to the connecting portion; and
        a magnetic pivot member, pivotally connected to the fixing pivot member and including a second electrical connector;
    wherein the second electrical connector is electrically connected to the first electrical connector when the first electronic device is connected to the magnetic pivot member;
    wherein the magnetic pivot member includes a cylindrical magnetic rotating shaft, the second electrical connector is configured at the cylindrical magnetic rotating shaft, the second electrical connector is electrically connected to the first electrical connector when the cylindrical magnetic rotating shaft is magnetically attached to the first electronic device.

12. The cover according to claim 11, wherein the covering portion includes a plurality of folding sections, the folding sections are foldably connected with each other, and a support structure is formed by folding the folding sections.

13. The cover according to claim 12, wherein the covering portion further includes a hinge structure, the hinge structure is configured between any two of the folding sections, and the two folding section are positioned to form the support structure.

14. The cover according to claim 13, wherein one of the folding section is a magnetic-attaching end portion, the magnetic-attaching end portion is magnetically attached to the first electronic device.

15. The cover according to claim 11, wherein the first electronic device is a display device.

16. The cover according to claim 15, wherein the display device is a touch display device.

17. The cover according to claim 11, wherein the cover further includes an electronic device attaching portion, the electronic device attaching portion is integratedly connected to an opposite side of the connecting portion relative to the covering portion, and a second electronic device is disposed at the electronic device attaching portion.

18. The cover according to claim 17, wherein the second electronic device is a keyboard device.

19. The cover according to claim 18, wherein the electronic device attaching portion is made of flexible materials, and the keyboard device is disposed at the electronic device attaching portion to form the flexible keyboard device.

* * * * *